United States Patent
Gannett

[11] 3,934,078
[45] Jan. 20, 1976

[54] KEY GENERATING SYSTEM
[75] Inventor: Danforth K. Gannett, Mountain Lakes, N.J.
[73] Assignee: Bell Telephone Laboratories, Incorporated, Murray Hill, N.J.
[22] Filed: May 1, 1946
[21] Appl. No.: 666,281

[52] U.S. Cl. .................. 178/22; 179/1.5 R; 331/78
[51] Int. Cl.² .......................................... H04L 9/04
[58] Field of Search ...................... 179/1.5; 178/22; 250/27 PS, 27 RC, 276 T; 331/78

[56] References Cited
UNITED STATES PATENTS

| | | | |
|---|---|---|---|
| 2,284,401 | 5/1942 | Manley | 179/15 PT |
| 2,289,564 | 7/1942 | Wrathall | 179/15 PT |
| 2,395,467 | 2/1946 | Deloraine | 179/15 A |
| 2,406,977 | 9/1946 | Wendt | 179/1.5 |
| 2,424,998 | 8/1947 | Nyquist | 179/1.5 |
| 2,424,999 | 8/1947 | Ostlund | 250/27 PS |
| 2,428,149 | 9/1947 | Falk | 250/27 PS |
| 2,429,471 | 10/1947 | Lord | 250/27 PS |
| 2,466,044 | 4/1949 | Schoenfeld | 250/27 GT |

Primary Examiner—M. R. Wilbur
Assistant Examiner—H. A. Birmiel
Attorney, Agent, or Firm—H. A. Burgess

EXEMPLARY CLAIM

1. In a key pulse generating circuit for producing key pulses varying in amplitude in highly irregular manner, said pulses occurring at a given rate, means to generate high speed off-on pulses at a rate many times higher than said given rate in a plurality of separate paths, means to hold over certain of said off-on pulses into subsequent of said high speed pulse times, means to combine the pulses so held over with pulses subsequently generated in certain of said paths to form combination of said high speed pulses, and means to select and combine with one another to form one of the final key pulses occurring at said given rate, individual ones of said last-mentioned high speed pulses occurring at instants of time separated from one another by several of said high speed pulses while discarding the intervening high speed pulses.

6. A pulse producing system comprising an initial portion operating at high frequency and a subsequent portion operating at low frequency, means to generate irregularly occurring pulses at high frequency in said initial portion, means in said subsequent portion to produce low frequency pulses each having a time period great enough to include many successive high frequency pulse periods, including means for selecting from among said high frequency pulses a plurality of pulses all occurring at different non-overlapping times within one low frequency pulse period and separated from one another in time by a plurality of high frequency pulse periods, and means to combine each such plurality of selected pulses into a single resultant low frequency pulse in said subsequent portion of said system.

10 Claims, 12 Drawing Figures

INVENTOR
D. K. GANNETT
BY
ATTORNEY

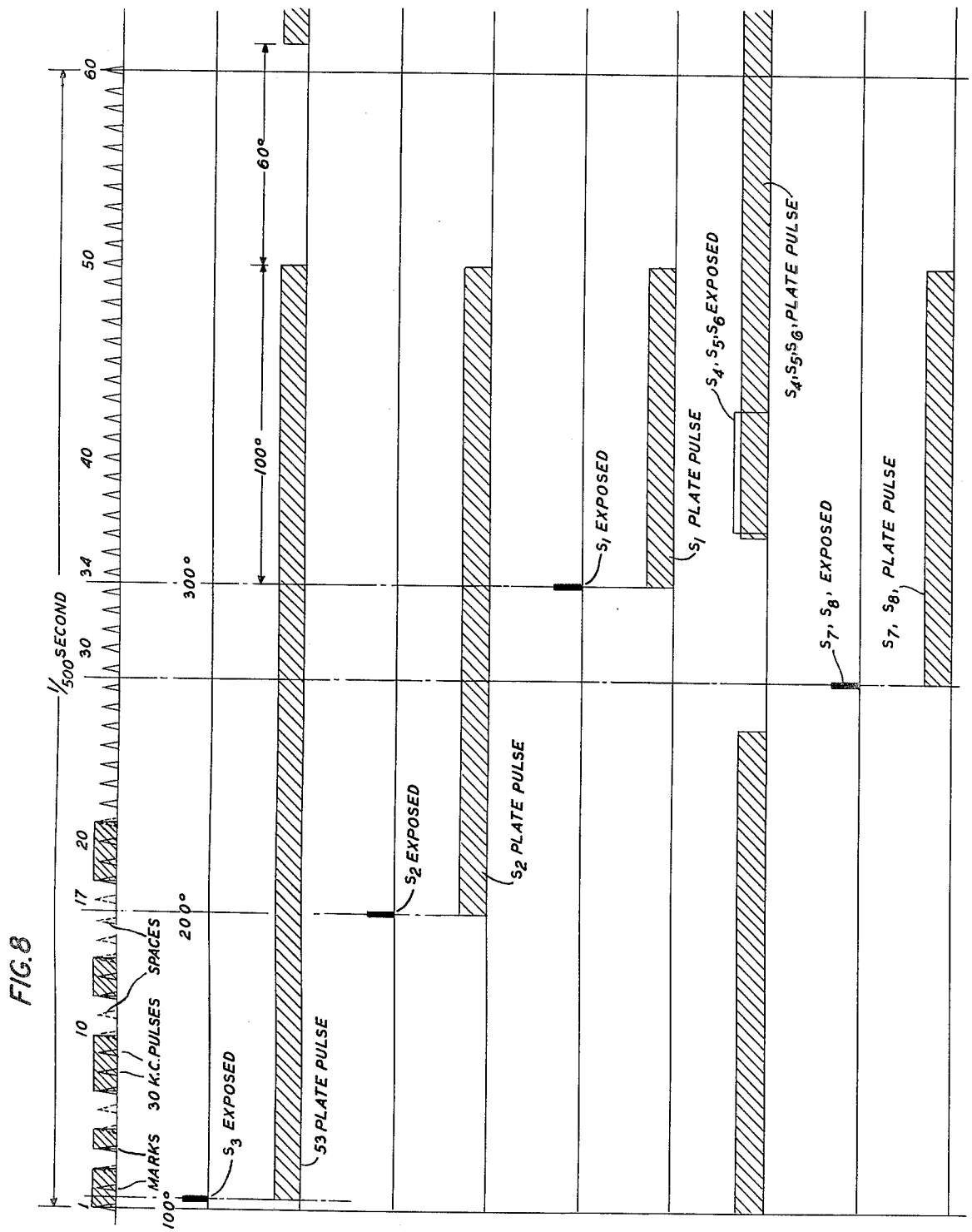

INVENTOR
D. K. GANNETT
BY H. A. Burgess
ATTORNEY

KEY GENERATING SYSTEM

The present invention relates to a pulse producing circuit suitable for use in producing irregularly occurring pulses that may be used among other things for enciphering or deciphering signals in a privacy signaling system.

An object of the invention is to produce in continuous manner long series of highly irregularly occurring pulses without repetition for long periods of time.

A related object is to construct such long series of irregular pulses out of currents having comparatively short cycles of repetition by suitable methods of combining and otherwise operating upon such currents.

It is a further object of the invention to generate practically random pulses by reproducible means so that duplicate generating means may be provided at separated locations and each generating means can be made to generate duplicate series of irregular pulses.

Further objects and the various principal and ancillary features of the invention will appear as the description proceeds.

Reference is made to the following detailed description of an illustrative embodiment of the invention and to the accompanying drawings in which:

FIG. 1 is a functional diagram of the complete impulse or key generating system to indicate how the different component parts are related and operate together;

FIGS. 2, 3, 4 and 5, when placed together as indicated in FIG. 12, show in schematic circuit diagram the details of the complete system that is indicated in outline in FIG. 1;

FIG. 8 is a timing chart for the system; and

In the general plan of the system of the invention, separate series of primary pulses are generated in separate circuits, these pulses being 2-valued or "off-on" pulses occurring in irregular successions but in timed relation to one another. These series of pulses are generated by cyclically operating means each with a different length of cycle. The pulses from the different circuits are variously mixed so that they add in different combinations to form either spaces or pulses, the pulses representing the sum of either an even or an odd number of the primary pulses. New off-on pulses are then produced depending upon whether the sum represents an even (including zero) number of the primary pulses or an odd number.

An important feature of the invention is the use of holding circuits in combination for the purpose of delaying by different times the application of individual input pulses to the output circuit for mingling with other outputs from other holding circuits in which different delays have occurred.

A further feature of the invention is the use of high speed primary pulse producers for generating relatively high frequency primary pulses and holding circuits actuated by these high frequency pulses, followed by circuits for sampling the high frequency pulses at a comparatively low frequency whereby the resulting low frequency pulses are each determined by only one of a large number of the high frequency pulses.

Still another feature of the invention comprises novel types of ring circuits and the manner of controlling them to produce the privacy pulses. Other features will appear from the detailed description to follow.

Figure 1:
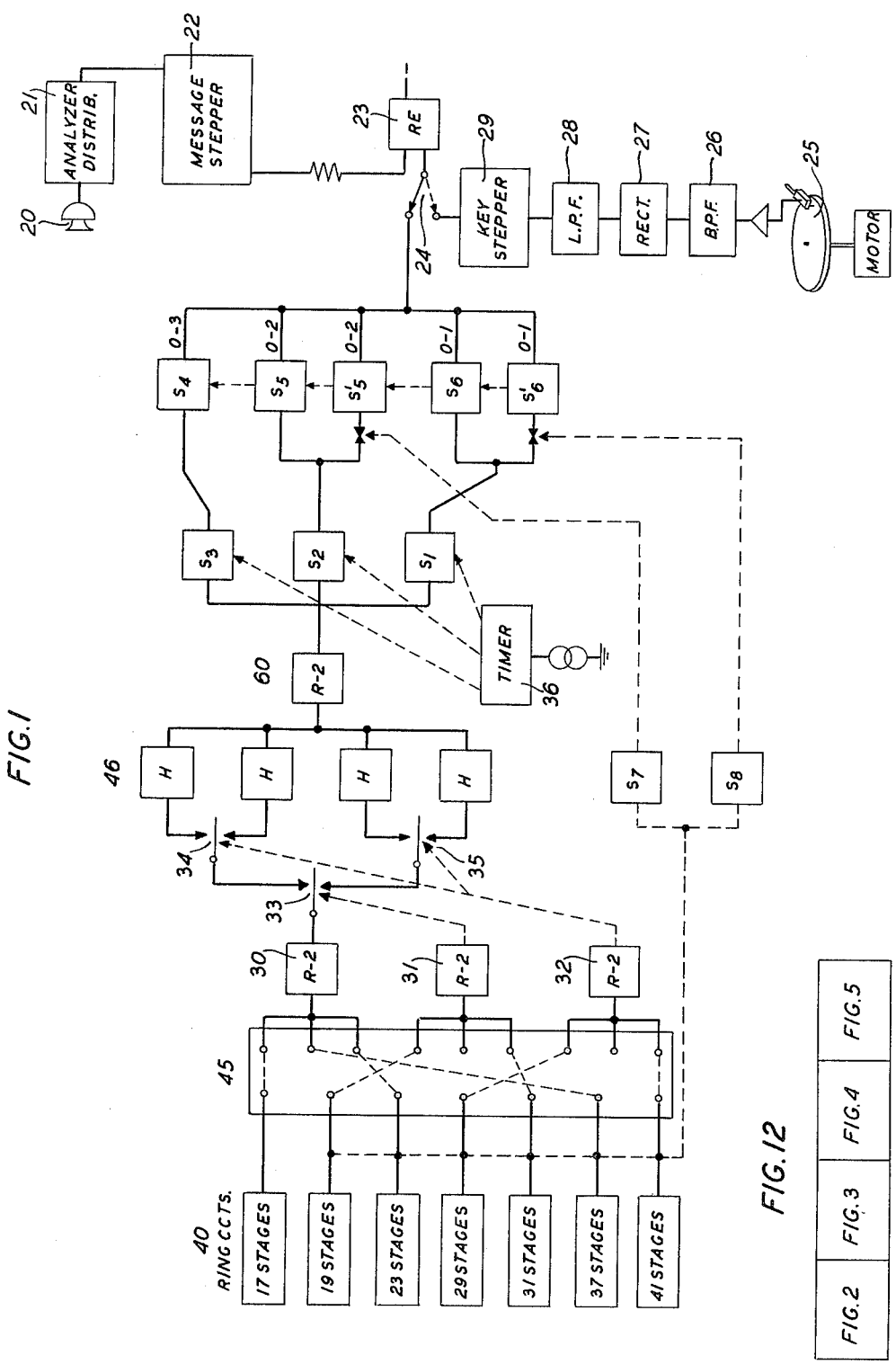

Referring first to FIG. 1, this is a functional diagram generally similar to FIG. 1 of my prior application Ser. No. 555,913 filed Sept. 27, 1944. In connection with the description of FIG. 1 and throughout the description, reference will be made to numerical quantities for illustration and to facilitate the description but without any intention of thereby limiting the disclosure.

At the left of FIG. 1 are seven ring circuits 40, each consisting of a different number of stages, the numbers being prime to each other. These ring circuits generate the basic "on" and "off" signals or marks and spaces out of which the eventual key pulses are constructed. The ring circuits will be more completely described later on but for the time being each may be considered to be a generator of off-on signals at the rate of 30,000 per second and to have a cycle of repetition equal to the number of stages. They may be internally connected to give a large variety of signal patterns.

The ring circuits 40 are connected in a cross-connecting panel 45 in various manner to three reentry circuits 30, 31 and 32, the scheme of connection being varied from time to time, such as daily, in accordance with a program. For example, in one possible connection scheme, three of the ring circuits 40 may be connected to reentry circuit 30 and two to each of the other reentry circuits 31 and 32. The reentry circuits have reentry points at multiples of 2. They deliver marking pulses when there is an odd number of marking pulses applied to their inputs and spacing pulses when there is an even number of marking pulses applied to their inputs.

The output signals from reentry circuit 30 are applied to one or another of the four holding circuits 46 which may be similar to the holding circuits of my previous applications. The particular holding circuit to which these output signals are applied is determined by the character of output signals in the reentry circuits 31 and 32. The drawing indicates the outputs of reentry circuits 31 and 32 as exerting a control over the application of pulses from reentry circuit 30 to the holding circuits 46 by indicating switches 33, 34 and 35 which are actuated to either of two positions over the dotted line controls shown extended from reentry circuits 31 and 32. It will be apparent from the detailed description to follow in connection with the other figures, however, that these switches are not physically present but that their functions are performed electronically.

Each holding circuit 46 comprises a pair of vacuum tubes cross-connected to cause complementary voltage conditions to exist on the two tubes. When the connections are such as to deliver pulses from reentry circuit 30 to a particular holding circuit, this holding circuit is switched to one of its two conditions by marks and to the other of its two conditions by spaces. Each of the other two holding circuits meanwhile is applying to the common output circuit either a mark or a space depending upon the position to which it was last switched by a previous output impulse from reentry circuit 30.

The output impulses from the four holding circuits 46 are added together and applied to the input of reentry circuit 60 which is similar to reentry circuits 30–32 and reenters at multiples of 2.

All of the apparatus up to this point is assumed to be operating at 30,000 signals per second. Following reentry circuit 60 are three stepper tubes $S_1$, $S_2$ and $S_3$. As will be more fully described these may comprise gas-filled tubes and their operate time is 500 operations per second on the assumption that the final key is to occur at the rate of 500 pulses per second. A timing circuit 36 applies enabling pulses to the steppers $S_1$, $S_2$ and $S_3$, once every five-hundredth of a second, to enable these steppers to sample the pulse existing at this instant in the output circuit of the reentry circuit 60. These enabling pulses are staggered in time so that each stepper samples a different one of the pulses in the output of reentry circuit 60. For example, these timing pulses may be applied at three different phases of the 500-cycle timing wave such as at 0°, 120° and 240°. The stepper $S_1$ would sample some output pulse which might arbitrarily be called pulse No. 1 from reentry circuit 60; stepper $S_2$ would then sample pulse No. 21 and stepper $S_3$ would sample pulse No. 41 of a series of 60 pulses occurring within a given 500-cycle period of time. Steppers $S_4$, $S_5$ and $S_6$ are fed respectively from steppers $S_3$, $S_2$ and $S_1$ and are arranged to put out weighted pulses of either of two values, zero or three steps in the case of stepper $S_4$, zero or two steps in the case of stepper $S_5$ and zero or one step in the case of stepper $S_6$. These outputs are added together and applied to the reentry circuit 23 when switch 24 is in its upper or full line position.

In order to give a more nearly uniform distribution of the key pulses with time, auxiliary steppers $S'_5$ and $S'_6$ are used, controlled from a pair of steppers $S_7$, $S_8$. These latter two have their inputs connected directly to the output sides of six of the ring circuits. Stepper $S_7$ has a sensitivity such that if "on" pulses are present on more than two of the ring circuit outputs at one time, stepper $S_7$ operates and disables auxiliary stepper $S'_5$. If an "on" pulse is present on more than three ring circuit outputs at the same time stepper $S_8$ operates and enables auxiliary stepper $S'_6$. When $S'_5$ is not disabled, it is operated by the output of $S_2$ in the same way as is $S_5$, and similarly, when $S'_6$ is enabled it is operated by the output of $S_1$ in the same way as is $S_6$. Stepper $S'_5$ puts out pulses of either value zero or two steps, and stepper $S'_6$ puts out pulses of either value zero or one step. These pulses when present are combined with the output pulses from the other steppers $S_4$, $S_5$ and $S_6$. This type of connection results in stepper $S'_5$ being enabled approximately one-third of the time and stepper $S'_6$ being enabled a different one-third (approximately) of the time. Neither stepper is enabled for approximately the other one-third of the time.

The outputs of steppers $S_4$, $S_5$, $S_6$ and $S'_6$ are added together and applied (assuming switch 24 is in upper position) to reentry circuit 23, together with the speech signals from message stepper 22. Reentry 23 is arranged to reenter at multiples of 6, and the result of operation of $S'_5$ and $S'_6$ as described is to produce a substantially uniform and random distribution of the six values of the signals at the output of 23.

As in the case of my previous application, the figure shows how the key generator of the present invention may be fitted into a speech privacy system of the type shown, for example, in R. L. Miller application, Ser. No. 542,975, filed June 30, 1944. In accordance with the Miller disclosure the key is supplied from a phonograph record, such as 25, the key being selected by band-pass filter 26, rectified at 27 and applied through a low-pass filter 28 to a key stepper 29. When the switch 24 is in its dotted or lower position, the key is supplied from the output of stepper 29 tothe input side of reentry circuit 23 along with message pulses from the output of message stepper 22, all as in the Miller disclosure. These signals are derived in the first instance from a speech input circuit 20 connected to an analyzer distributor circuit 21 of a type shown in detail in the Miller application. The key generator of the present invention is substituted for the key derived from the phonograph, as in the Miller application, by merely shifting the switch 24 from its lower to its upper position.

Reference will now be made to the detailed showing of the key generator as a whole, as shown in FIGS. 2 to 5. One of the ring circuits 40 is shown in detail in the upper part of FIG. 2 and another one is indicated by block diagram in the lower part of the figure. The other five ring circuits are of the same type but are omitted from the drawing for simplicity.

Figure 2:
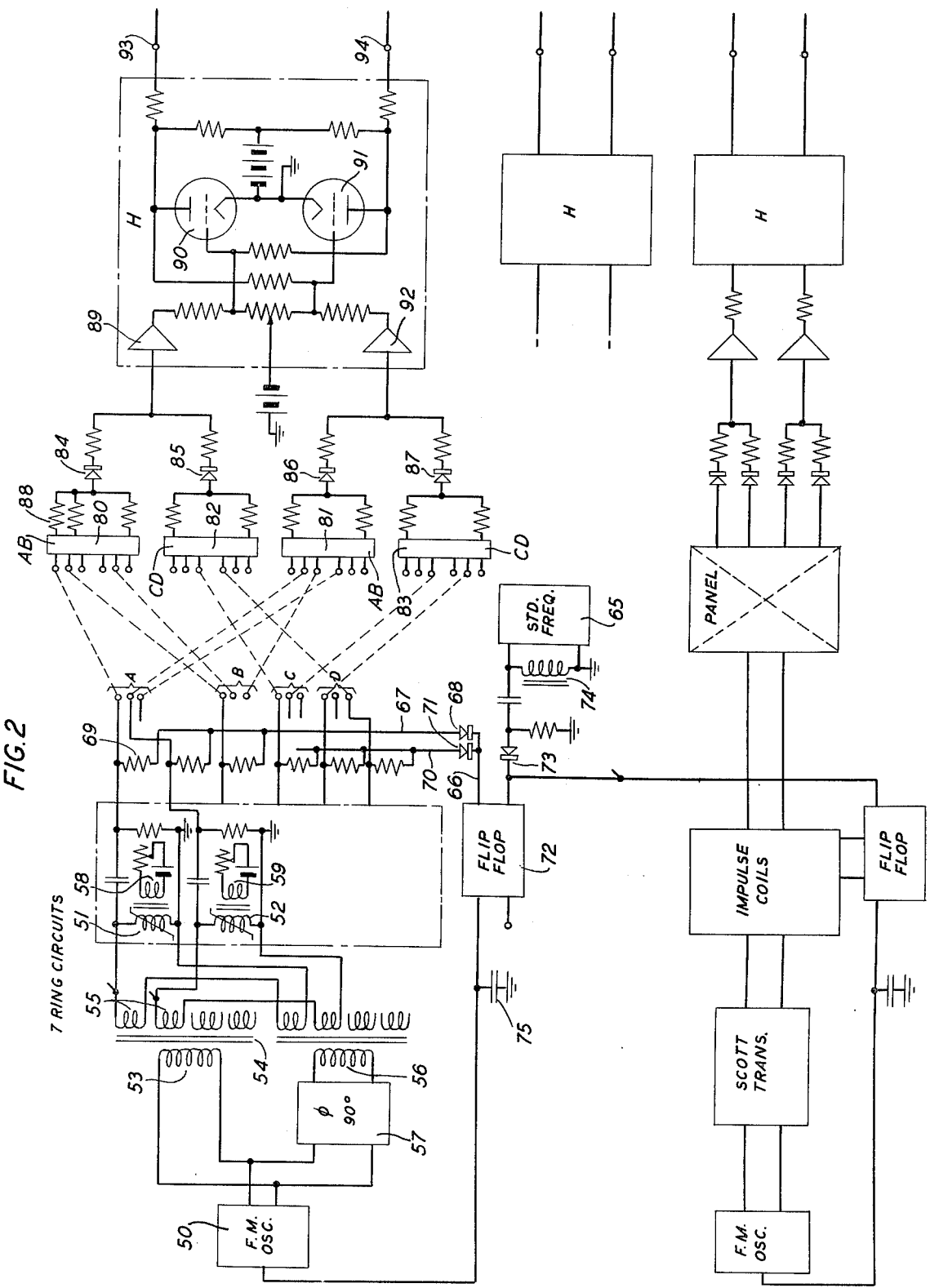

While each of these ring circuits could consist of electronic tube stages of known types, the type of ring circuit disclosed in FIG. 2 in accordance with the present invention makes use of impulse coils supplied with alternating currents of different phases. Assuming the ring circuit shown in detail in FIG. 2 to be the 17-stage ring circuit of FIG. 1, there would be 17 of these impulse coils, two of which are indicated at 51 and 52. In other words, there would be one impulse coil per ring circuit stage. These coils are driven from a source of alternating current in the form of a frequency modulated oscillator 50, generating current of a frequency of 30,000 cycles divided by the number of ring stages, in this case 17. The different phases of current for driving the individual impulse coils are derived from a so-called Scott transformer consisting of two parts. The first part comprises primary winding 53, core 54 and a number of secondary windings 55. The second group comprises primary winding 56 and a corresponding number of associated secondary windings. A 90-degree phase shifter 57 is included ahead of winding 56. The secondary windings are connected in pairs in a series relation, each pair consisting of one winding from each transformer secondary group with the number of turns in each winding chosen to give the desired phase.

The impulse coils 51, 52, etc., and their manner of operation may follow the disclosure of Wrathall U.S. Pat. No. 2,117,752, May 17, 1938. As the magnetic circuit of the coil at some part of the driving wave, generally near zero, passes rapidly from negative to positive saturation, the flux reversal generates a sharp voltage pulse. A pulse of opposite polarity is generated a half-cycle later but this is discarded at a later point in the circuit. The points at which the positive pulses occur in the different coils are distributed uniformly around 360 electrical degrees.

This could be done by using 17 (in this case) pairs of phase windings on the Scott transformer, one pair for each of the 17 impulse coils and distributing the phases of these windings uniformly around 360 electrical degrees. The unwanted negative pulse produced by the impulse coils could then be suppressed by a properly poled rectifier in each of the 17 output circuits. An economy in apparatus can be effected, however, by producing only four phases and by using individual biases on the impulse coils to determine the point in the respective phase at which the unsaturated region is reached. For example, if the four phases are called A, B, C and D, four of the impulse coils 51, 52, etc., may be driven from phase A, four from phase B, four from phase C and five from phase D, in the case of a 17-stage ring. A diagram has been included in FIG. 6 to show how the biases may be chosen in the case of a 31-stage ring circuit. In this case, eight coils are connected to each of phases A, B and C and seven coils to phase D. Biasing circuits are indicated in FIG. 2 at 58 and 59 in the form of a second winding through which may be passed an adjustable amount of current from a battery or other suitable source.

Figure 6:
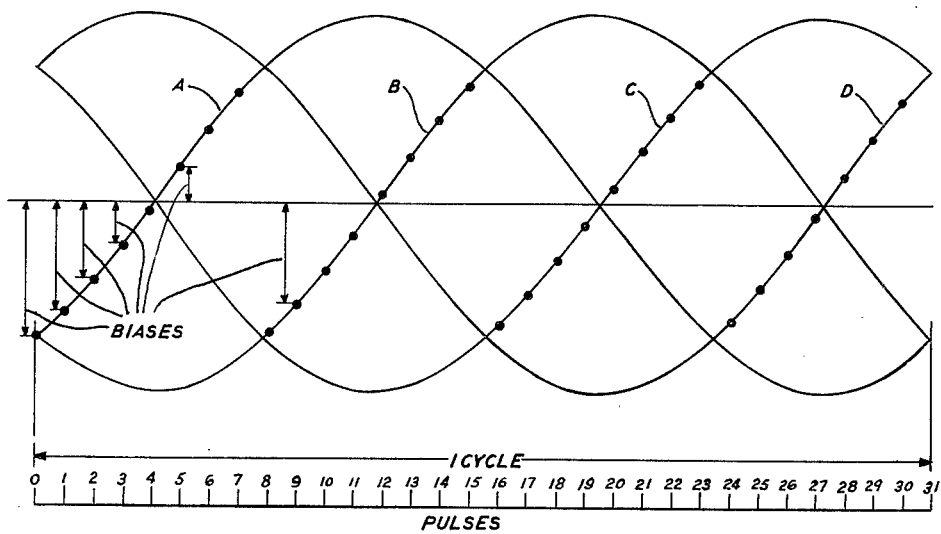
FIGS. 6 and 7A show graphs of wave forms to be referred to in the description.

As indicated in FIG. 6 the rising part of each phase voltage wave is chosen over a substantially linear portion for driving the respective group of coils. The individual biases are stepped so that only one coil reaches its unsaturated region at a time. A more nearly linear driving wave may be obtained by means of the circuit illustrated in FIG. 7 which may be substituted, if desired, for the Scott transformer circuit of FIG. 2.

Figure 7:
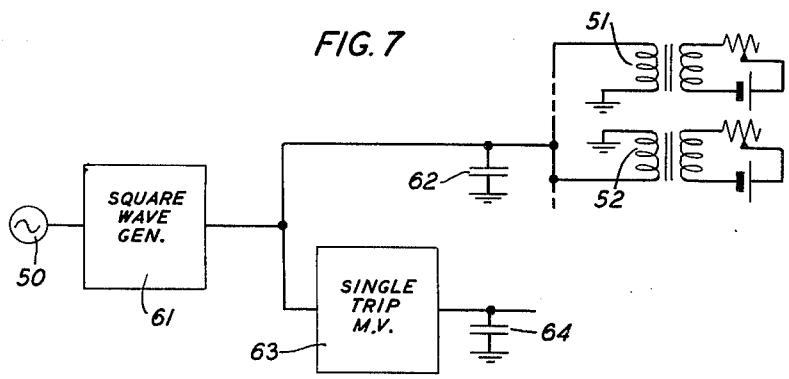
FIG. 7 is a partial schematic circuit diagram of an alternative method of applying driving waves to the ring circuits.
Figure 7A:
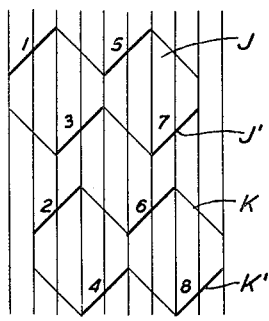

In FIG. 7, the output wave from oscillator 50 is passed through a square wave generator 61, the output of which is shunted by a condenser 62. This arrangement will generate a substantially triangular wave of the type shown in J in FIG. 7A and the bias points may be chosen along the linear portions 1 and 5 for certain of the coils. By use of a single trip multivibrator 63 and condenser 64, also connected to the output of square wave generator 61, a similar triangular wave K is developed displaced 90° in phase with respect to the wave J. The bias points may be chosen along the rising linear portions 2 and 6 of the wave K. The wave J may be reversed in phase and applied to others of the impulse coils as shown at J'. The rising linear portions 3 and 7 of this wave may be used. Similarly, wave K can be reversed in phase to give wave K' and the ascending portions 4 and 8 of this wave may be used for driving the coils. Coil 52 of FIG. 7 illustrates one case in which the phase of the driving wave is reversed with respect to that used on coil 51.

Referring further to FIG. 6, it will be apparent that the time at which a voltage wave reaches and passes through the unsaturated portion of the characteristic is determined by the magnitude of the bias used for the particular coil, and, as noted above, the various values of bias are indicated by the displacements of the dots in the vertical direction from the zero axis of the waves. It is also apparent that the frequency of occurence of the pulses is the same, namely 30,000 per second in the case of all of the ring circuits but that the frequency of the alternating current source 50 differs from one ring circuit to the next. The period of the alternating current wave is directly proportional to the number of coils or stages in the ring circuit.

One feature of the invention comprises a frequency controlling circuit for maintaining the frequency of the driving oscillator at the correct value to produce the 30,000-cycle pulses. This circuit is shown in detail in connection with the upper ring circuit of FIG. 2 and involves a comparison circuit between the output of a pulse producing circuit comprising impulse coil 74 driven from a standard frequency oscillator 65, and a circuit 66 carrying the pulses produced in all of the coils of the given ring circuit. It will be noted that the circuit 66 has two branches, one branch 67 being connected through a rectifier element 68 by way of high resistances 69 to the various output circuits of the coils belonging to the A and B phases and the other branch 70 being similarly connected to all of the output circuits of the coils associated with the C and D phases and also including a rectifier 71. Positive pulses only are therefore selected and impressed on the circuit 66 leading to one side of the flip-flop circuit 72. The opposite input terminal of the flip-flop circuit 72 is connected to the standard frequency pulse producing circuit through a rectifier 73 which also selects only the positive pulses generated in the impulse coil 74 and occuring at the standard frequency of 30,000 per second.

The flip-flop circuit 72 is of the well-known Eccles-Jordan type comprising a pair of vacuum tubes which operate in complementary fashion to produce output pulses of square wave form having a length proportional to the difference in time between the application times of the input pulses to the opposite input terminals. The resulting direct current is integrated in the condenser 75 and applied to the frequency-modulated oscillator 53.

With proper adjustment this circuit automatically maintains the frequency of the oscillator 50 at the correct value to result in the production of output impulses from the ring circuit at 30,000 impulses per second. The adjustment is such that normally the pulses in the output of the flip-flop circuit 72 are about the same length as the intervening spaces. Under these conditions if the frequency of the pulses from the ring circuit varies, the time of occurrence of these pulses relative to those from the standard frequency oscillator 65 also varies such that the output pulses from circuit 72 increases in length if the output pulses from the ring circuit occur too early and decrease in length if they occur too late. Corresponding variations occur in the integrated direct current applied to the frequency-modulated oscillator in such direction as to tend to restore the pulses to the right time relationship. The frequency-modulated oscillator circuit 50, may be of any suitable type such as an oscillator provided with a reactance tube as the frequency controlling element, as in De Lange U.S. Pat. No. 2,278,063, issued Mar. 13, 1942, for example.

The same standard frequency source 65, impulse coil 74 and rectifier 73 serve for all of the ring circuits and is therefore shown connected to the flip-flop circuit for the lowermost ring circuit indicated in FIG. 2. It would, of course, also be connected to those not shown.

Reference to FIG. 6 will show that positive pulses are produced in substantially succeeding quarter-cycles of the phases A, B, C and D which means that the negative pulses produced, for example, in a descending quarter phase of phase A will overlap or occur at the same time as the positive pulses produced in the rising quarter phase of phase C, but that as far as the pair of phases A and B are concerned neither produces negative pulses at the same time that the other is producing positive pulses. This is also true of the pair of phases C and D. It is for this reason that circuit 67 in the frequency control circuit can be connected to phases A and B and that a separate circuit 70 needs to be connected to phases C and D.

For a similar reason phases A and B are paired and phases C and D are paired in taking off the output pulses for use in the subsequent portions of the key generating circuit. In order to produce output pulses consisting of marks and spaces occurring in an irregular manner, a portion only of the terminals belonging to phases A and B are connected to one of the output terminal groups AB such as terminal group 80. The remaining terminals of the A and B phases are connected to a second terminal group 81. These connections can be made in any chosen and irregular manner and may be changed from time to time, such as daily, in accordance with a program. Similarly, two CD terminal groups are shown at 82 and 83 with some of the terminals belonging to the C and D phases connected to one of these terminal groups and the remainder to the other. It will be clear that at the terminal groups 80 to 83 both positive and negative pulses appear since no means have been provided up to this point for suppressing the negative pulses. Due to the use of only the four phases and the grouping of the output terminals as discussed above, four rectifiers 84, 85, 86 and 87 suffice to suppress all of the negative pulses and to allow the positive pulses to pass. Rectifier 84 is connected through voltage adding resistances 88 in multiple to all of the terminals in one AB terminal group and the other rectifiers 85, 86 and 87 are similarly connected to the other respective terminal groups. The impulses occurring on the output sides of the rectifiers 84 and 85 together make up a series comprising marks and spaces. Similarly, the combined output of the rectifiers 86 and 87 is made up of marks and spaces, each mark coinciding in time with a space in the output of rectifiers 84 and 85 and vice versa.

The output pulses from rectifiers 84 and 85 are sent through an amplifier 89 to the grid of the upper tube 90 of a flip-flop or holding circuit, comprising a pair of tubes 90 and 91. (This circuit may be of the same type as the flip-flop circuit 72 previously referred to.) The output pulses from rectifiers 86 and 87 are supplied through amplifier 92 to the grid of tube 91. The plates and grids of these tubes are cross-connected in such a way that current flow through one of the two tubes causes an interruption of the current flow through the opposite tube. For example, a positive pulse applied to the grid of tube 90 and the coincident space occurring on the grid of tube 91 causes tube 90 to transmit saturation current and tube 91 to be cut off. This reduces the potential of output terminal 93 to a very low positive value which, for practical purposes, may be considered ground or zero potential, while the potential of the opposite output terminal 94 is raised to substantially the plate battery potential of, for example, 250 volts. The reverse of these conditions is produced whenever a pulse appears on the grid of tube 91 accompanied by a space on the grid of tube 90.

Since there are seven of these holding circuits, one for each of the seven ring circuits, there are seven pairs of output terminals corresponding to 93 and 94, each pair of which has a positive pulse on one terminal and substantially ground on the other terminal. These voltage conditions on the various output pairs of terminals are of varying duration, either reversing in the case of each pair 30,000 times per second or lasting over for one or more periods of the 30,000-cycle pulse rate, depending upon whether the pulses on the same input terminal of the holding circuit alternate with spaces at the 30,000-cycle rate, or whether two or more pulses succeed each other. This is illustrated in the top row of pulses portrayed in FIG. 8 where the full line sharp pyramidal pulses are the pulses at the output side of rectifiers 84, 85 (or 86, 87). Those shown dotted indicate spaces since the pulse is absent although the time position is shown at which it would occur if present. The left-hand part of this graph is drawn to show how different length marks and spaces are produced by the action of the holding circuits.

Figure 3:
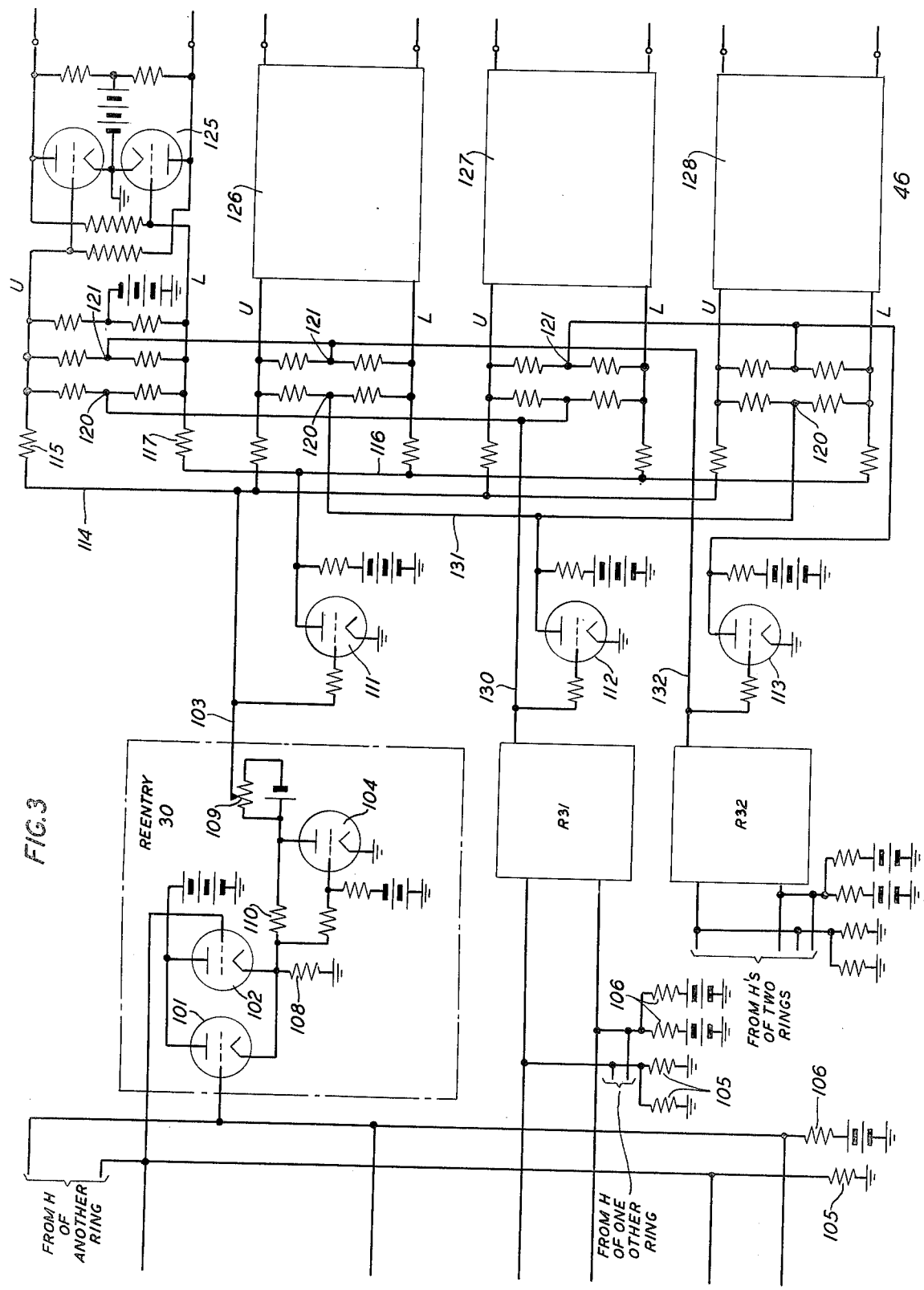

The reentry cicuit 30, FIG. 3, comprises a pair of triodes 101 and 102 connected as a cathode follower stage to output terminal 103 across which is connected a triode 104 having its cathode connected to ground. The grids of the tubes 101 and 102 are connected to the output terminals, such as 93 and 94 of the various holding circuits H so that ground appears on one of the two grids whenever positive voltage appears on the other. As explained in connection with FIG. 1, the same reentry circuit, such as 30, is connected to the holding circuits belonging to a plurality of the ring circuits. The grids of tubes 101 and 102 are, for example, connected to three of the ring circuit outputs. To preserve the symmetry of the circuit of tubes 101 and 102, a fourth ring circuit is simulated by connecting the grid of one of the tubes through a resistor 105 to ground and the grid of the other tube to a resistor and biasing battery 106 to ground. The operation of the tubes 101, 102 and 104 is such that regardless of whether zero, one, two, three or four positive voltages from the ring circuit outputs are applied to one of the grids of tubes 101, 102 (with the inverse number of grounds on the opposite grid) the output appearing at 103 has either the value of a mark or a space. Further, as previously noted, a mark appears in response to an odd number of input marking pulses and a space appears in response to an even number of input marking pulses. For example, if one pulse appears on the grid of tube 101 and three additive pulses on the grid of tube 102 three steps of current flow through the cathode resistor 108. This current all comes from triode 102, since the bias on these tubes is such that one impulse alone still leaves the grid of 101 more negative than the cathode and produces no current flow through it. The three steps of current flowing through resistor 108 are reduced by the counter voltage applied in series by the battery and resistor combination shown at 109 so that a marking pulse of, for example, one step value appears at 103. The same situation occurs if three pulses appear on the grid of tube 101 and one pulse on the grid of tube 102. These two conditions are the only conditions where an odd number of pulses appears on either grid and as shown they result in a marking pulse at output terminal 103. If no pulse appears on the grid of tube 101 and four pulses appear on the grid of tube 102 four steps of current flow through cathode resistor 108 producing a sufficiently positive voltage to raise the grid potential of tube 104 from its cut-off region to its full conduction region and this tube draws sufficient current through series resistor 110 to subtract two steps of voltage from that appearing across resistor 108. The further two-step reduction in voltage due to battery and resistor 109 reduces the voltage at output terminal 103 to zero corresponding to a space. Since the four-step condition assumed on tube 102 produces the same effect as a zero pulse on that grid accompanied by four pulses on the opposite grid, the only other condition corresponding to an even number of input pulses to consider is that in which two pulses of current are applied to each grid of tubes 101, 102. The adjustments are such that under this condition two steps of voltage are produced across resistor 108 and the effect of these on the output is reduced by resistance and battery 109 to zero, or a space.

The reentry circuits 31 and 32 are entirely similar to reentry circuit 30 and have been indicated merely by boxes. Since reentry circuit 31 is assumed to be connected to only two ring circuits, two bias resistors similar to 105 are connected in parallel to ground on one side and two biasing combinations of resistance and batteries similar to 106 are connected in parallel on the opposite side to take the place of the absent ring circuits. This same procedure is followed in the case of reentry circuit 32.

In FIG. 1, the reentry circuits 31 and 32 are diagrammatically indicated as connected through switches to the four holding circuits 46, but it was noted that in the detail circuits the functions of these switches are performed by electronic tubes. In FIG. 3, the holding circuits 46 are shown at 125, 126, 127 and 128, each of these being a two-tube circuit of the same type as the holding circuits H of FIG. 2. These holding circuits 46 have their inputs connected through leads 114 and 116 to respectively an input terminal and an output terminal of triode 111. An isolating resistance 115 is shown in one side of each connection and a similar resistance 117 in the opposite side. Each holding circuit is shown provided with an upper input terminal U and a lower input terminal L. Bridging resistances with center points at 120 and 121 are connected across input terminals of holding circuits 125 and similar bridging resistances are connected across input terminals of each of the other holding circuits. Points 120 of holding circuits 125 and 127 are brought through lead 130 to the input terminal of triode 112 and the similar points 120 of holding circuits 126 and 128 are connected through lead 131 to the plate of triode 112. Points 121 of holding circuits 125 and 126 are connected over lead 132 to the input terminal of triode 113, while the corresponding points 121 of holding circuits 127 and 128 are connected to the plate of tube 113.

The voltage relations are such that in order to operate the upper tube of any given holding circuit, positive potential must be applied to points 120, 121 of that circuit with ground or low potential at L. Similarly, to operate the lower circuit positive potential must be applied to points 120, 121 with ground or low potential at U. A marking pulse (positive) at terminal 103 makes the terminal U of each holding circuit positive and the terminal L of each holding circuit zero or low voltage, since the triode 111 passes saturation current in response to a marking pulse on terminal 103. However, only that holding circuit will respond to these voltage conditions which has a positive potential applied to both points 120 and 121. Such a condition is satisfied in holding circuit 125 in response to a marking pulse in the output circuit of both reentry circuits 31 and 32 at the same time, since such pulses apply positive voltages to conductors 130 and 132. It will be noted that in no other cases are both points 120 and 121 rendered positive by the applied pulses. If a marking pulse is received by reentry circuit 31 but not by reentry circuit 32, holding circuit 127 responds to the pulses appearing at terminal 103 while the other holding circuits remain in the condition to which they were previously set. If a marking pulse is received in only reentry circuit 32, holding circuit 126 responds to the pulses appearing at terminal 103; and if a marking pulse is not received in either reentry circuit 31 or 32, holding circuit 128 responds to the pulses appearing at terminal 103.

As a result of the action of the four holding circuits 46, there will be impressed on the input leads 133 and 134 of the reentry circuit 130 (FIG. 4) either a mark or a space from each of the four holding circuits, three of these conditions being held over from a previous pulse period and the fourth one being produced by a currently occurring pulse. The voltages corresponding to these marks and spaces are added and applied to the respective input conductors 133 and 134 causing the reentry circuit 130 to act similarly to reentry circuit 30 of FIG. 3 to put out in the outgoing conductor 136 resultant marks and spaces occurring in a highly irregular order. The reentry circuit 130 comprises tubes 101 and 102 with a common cathode resistor 108 as in the case of circuit 30 and a voltage reducing tube 104. No further description of this circuit appears necessary since it operates in the manner previously described for reentry circuit 30.

The marks and spaces on output conductor 136 are applied to the grid circuits of the three stepper tubes $S_1$, $S_2$ and $S_3$, these being gas-filled tubes supplied with a source of pulsing plate voltage indicated by the rectangle 137 including a diagram of a pulsing voltage wave. The character of the interrupted plate supply is such that a positive voltage pulse is supplied to the plate for about 1.7 milliseconds and is interrupted for 0.3 millisecond, the total time of the pulse plus interruption time being 2 milliseconds or 1/500 second. In practice a single interrupted supply would be used for all three steppers.

Each of these steppers has its grid negatively biased as from a battery 138 which is sufficiently negative to prevent the stepper tube from breaking down in response to a marking pulse in conductor 136 alone. In order for the stepper tube to break down, a timing pulse must also be applied to the grid at the same time as a marking pulse in conductor 136. Considering the stepper tube $S_3$, a timing circuit is shown in the broken rectangular outline 140 operated from a standard 30,000-cycle source 65 which may be the same source as is indicated in FIG. 2. This is followed by a frequency divider circuit 135 of any suitable type such as those known in the art for deriving in the output of the circuit 135 a 500-cycle wave. This frequency divider may consist of tandem stages of frequency halvers or regenerative modulator types of stages in which a reduction in frequency of severalfold may be accomplished in the same stage or it may include a so-called dipper and bucket type of circuit in which charges placed on a small condenser are used to charge a large condenser in steps in a form of staircase wave until the large condenser is discharged and the charging cycle repeats. It is assumed that the final stage, at least, of the frequency divider 135 includes a multivibrator type of circuit producing the well-known type of wave form shown by the small diagram *e* adjacent the output lead 141.

When this wave is applied to the input terminal of the pulse timer 140, it is differentiated in the condenser-resistance circuit 142 and the negative pulse is absorbed in the diode 143 leaving a sharp positive pulse to be applied to the grid of triode 144. This together with triode 145 forms a well-known type of single trip multivibrator producing in its output a sharp positive pulse followed a definite time later by a sharp negative pulse. The time constant of the circuit is proportioned by the values of the condenser and resistance shown to cause the second or negative pulse to follow the initial pulse by, for example, 100 electrical degrees. (This timing is indicated in preference to the 120-degree timing indicated in the description of FIG. 1 in order to allow a wider operating margin for the stepper tubes.) The initial or positive pulse of this pair of pulses has no affect on the triode 146 since this is normally passing saturation current. The second or negative pulse, however, reduces the space current of tube 146 to zero causing the production of a sharp positive pulse in the plate circuit having a flat top and a pulse length of about 10 microseconds. It is the presence of this latter pulse which enables the stepper $S_3$ to sample a simultaneously occurring marking pulse, if present, in conductor 136. If a space is present on conductor 136 when this timing pulse occurs, stepper tube $S_3$ remains non-conducting.

Pulse timer circuit 150 operates in an entirely similar manner to apply a timing pulse to the grid of stepper tube $S_2$ except that the delay interval in this case is taken as 200 electrical degrees. The same is true of pulse timer 101 and stepper tube $S_1$ except that the time delay in this case is 300 electrical degrees. These three stepper tubes $S_1$, $S_2$ and $S_3$ therefore respond to three separate marking pulses occurring at three different times in conductor 136. For example, considering the 60-pulse time intervals that occur on conductor 136 in a given 2-millisecond period, stepper $S_3$ under the conditions assumed would sample the 1st pulse interval, stepper $S_2$ would sample the 17th pulse interval and stepper $S_1$ would sample the 34th pulse interval. It will be understood that the 100°, 200° and 300° phase positions represented at which the exposure pulses for these three steppers occur are arbitrary values when referred to the timing wave and that a phase shifter could be included in circuit with the frequency divider 135 to facilitate lining up these exposure pulses with the pulses received from the holding circuits 90, 91 etc.

This time relationship will be more clearly understood by reference to the timing diagram of FIG. 8. This diagram covers one period of the 500-cycle wave or 2 milliseconds of time. At the top of the figure are shown the 60 times in which a marking pulse may occur on lead 136. Due to the action of the holding circuits the pulses will actually vary in length with intervening spaces also varying in length, as previously explained. The exposure pulses for the three steppers $S_1$, $S_2$ and $S_3$ must be accurately positioned to distinguish between one ring circuit pulse time and the next since this time from one ring circuit pulse to the next may either be occupied by a pulse or may comprise a space and it is necessary for the exposure pulse to distinguish one of these possible conditions from the other. The plate voltage supply pulse for all three steppers comes on just ahead of the exposure pulse for stepper $S_3$ (shown at 100° in FIG. 8) and stays on until about 100 electrical degrees after the exposure pulse of stepper $S_1$ or for about 1.7 milliseconds. This voltage supply is then interrupted for the remaining 60° of the cycle.

These pulsing plate supplies may be of the type shown, for example, in Lundstrom-Schimpf application Ser. No. 456,322 filed Aug. 27, 1942 to which reference is made for a complete disclosure. Any other suitable type of plate voltage supply may be used.

Figure 4:
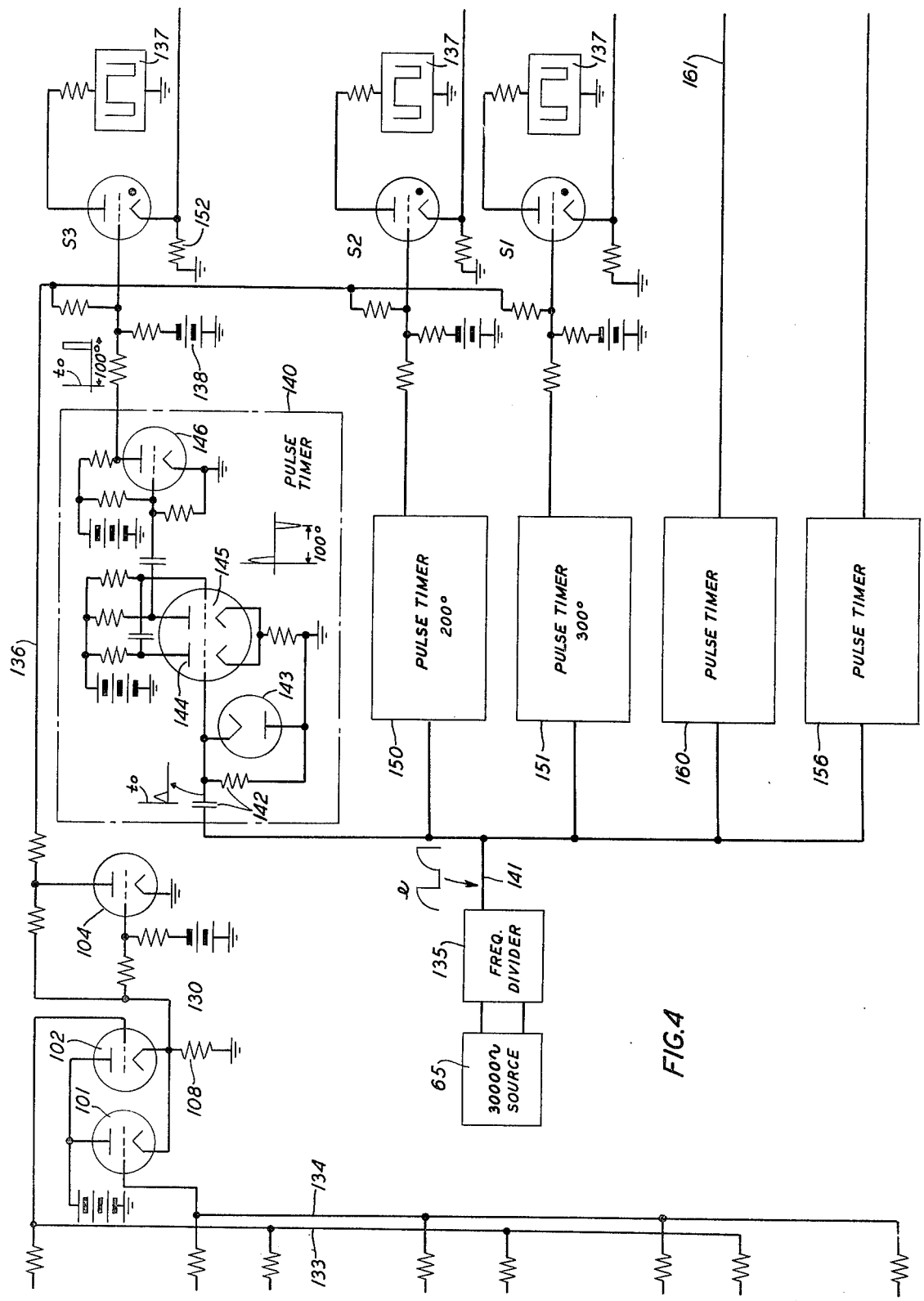
Figure 5:
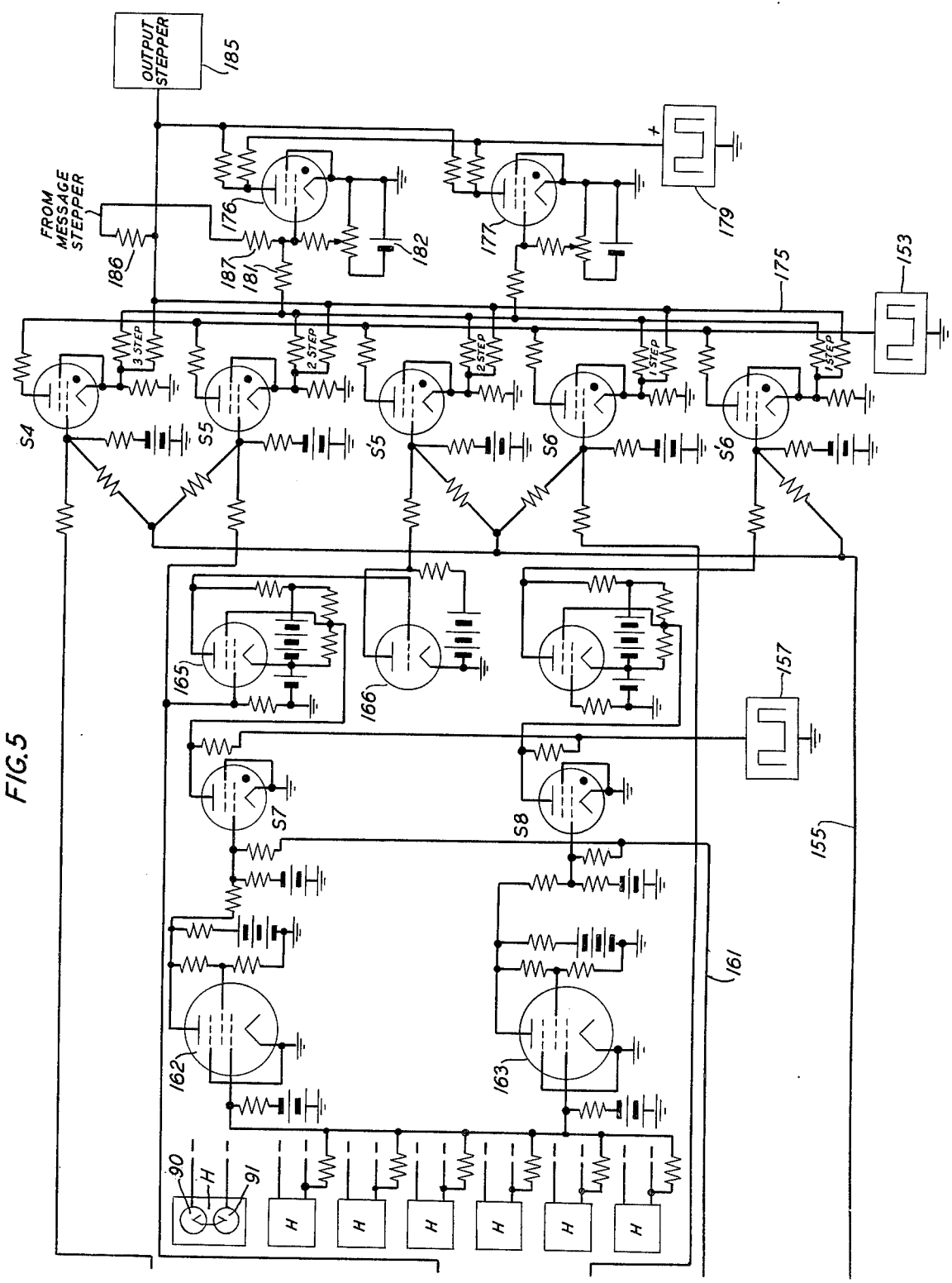

It is apparent from the timing diagram of FIG. 8 that the possible time in which current may flow through all three steppers $S_1$, $S_2$ and $S_3$ in any one 2-millisecond period comprises an overlapping time of about 100 electrical degrees occurring just before the plate voltage is interrupted. It is in this 100° time interval that the information is used. Positive pulses occurring across the cathode resistors such as 152 of each stepper are transmitted to the control grid circuits of steppers $S_4$, $S_5$ and $S_6$ FIG. 5 which may be entirely similar to steppers $S_1$, $S_2$ and $S_3$ and which are supplied with an interrupted plate voltage from source 153. Exposure pulses for these steppers are obtained from common conductor 155 and pulse timer 156 (FIG. 4). The requirements on these timing pulses are entirely different from those on the pulses from timers 140, 150 and 151 since all that is required of the steppers $S_4$, $S_5$ and $S_6$ is to distinguish whether or not a pulse is present in the steppers $S_1$, $S_2$ and $S_3$ during the 100° interval indicated on FIG. 8. This interval is slightly in excess of 0.5 millisecond so that the timing pulse may have a width of the order of 0.25 millisecond, for example. The plate voltage from source 153 may come on as indicated in FIG. 8 slightly after the $S_1$ exposure pulse and may be interrupted for about 60 electrical degrees.

The steppers $S_7$ and $S_8$ are supplied with interrupted plate voltage from source 157 which comes on shortly in advance of the exposure time of stepper $S_1$, for example, and remains on until the end of the plate supply pulses produced in source 137. Steppers $S_7$ and $S_8$ receive exposure pulses from timer 160 of FIG. 4 over common conductor 161. These exposure pulses occur just after (or they overlap the instant when) the power supply pulse comes on for the plates of these tubes as indicated in FIG. 8. In order for the steppers $S_7$ and $S_8$ to conduct, it is necessary to apply to their control grids positive pulses from the input pentodes 162 and 163 in addition to the exposure pulses received over conductor 161. These pentodes have their control grids connected in multiple to one side of six of the seven holding circuits of FIG. 2, these connections being indicated in FIG. 5 by repeating the representation of the seven circuits as small rectangles. Voltage adding resistors connect between the control grids of the pentodes and, for example, the lower output terminal of each of these six holding circuits. A negative bias voltage is applied to the grid of pentode 162 of such value as to require marking pulses from at least two of the holding circuits before the pentode passes current. For zero, one or two steps of applied voltage the pentode in cut off while for three or more steps of applied voltage the pentode transmits saturation current. Pentode 163 has a larger bias voltage such as to require four or more steps of applied voltage to enable it to transmit current.

When either pentode is cut off, positive voltage is applied to the corresponding stepper $S_7$ or $S_8$ permitting that stepper to break down upon the application to its control grid of the timing pulse. When either pentode is transmitting saturation current on the other hand, negative voltage is applied to the grid of the corresponding stepper tube $S_7$ or $S_8$ and the stepper tube is not broken down by the application of the timing pulse alone.

Stepper tube $S_7$ determines whether or not stepper $S_5'$ breaks down in response to a marking pulse in the output of stepper $S_2$. If stepper $S_7$ is transmitting current when such marking pulse occurs, the screen grid of tube 165 has its voltage too far negative to permit tube 165 to pass current. Under this condition, tube 166 is transmitting saturation current and a negative voltage is applied to the grid of stepper $S_5'$ of too great value to permit this stepper tube to break down in response to a timing pulse received over conductor 155. If stepper $S_7$ is in non-conduction condition at this time, however, tube 165 is transmitting saturation current, tube 166 is cut off and the grid of stepper tube $S_5'$ is sufficiently positive to permit a timing pulse received over conductor 155 to discharge the tube $S_5'$.

The control circuit between stepper tube $S_8$ and stepper tube $S_6'$ is similar except that the stage corresponding to 166 is omitted. Stepper tube $S_6'$ is therefore enabled in response to the condition in which stepper $S_8$ is transmitting current and is disabled in response to the condition in which stepper $S_8$ is non-conducting.

The voltages developed in the cathode resistors of the steppers $S_4$, $S_5$, $S_6$, $S_5'$ and $S_6'$ are combined in additive sense by the resistors appearing in their output leads and these resistors are of graduated value such as to apply different step values of voltage to the output conductor 175 leading to output stepper 185 and also to the grid circuits of the reentry tubes 176 and 177. This reentry circuit is the same as that disclosed in my prior application, Ser. No. 555,913, above referred to, except that in the present case the reentry circuit comprises one less voltage reducing tube since the range of step values to be handled is smaller in the present case. Similar reference characters have been applied to the corresponding parts to facilitate reference to my earlier application for detailed description. The reentry tubes 176 and 177 are supplied with interrupted plate voltage from source 179 and when either of these tubes fires the voltage at point 175 is reduced by six steps. If both tubes fire together the voltage at point 175 is reduced by twelve steps.

The system outlined in FIG. 1 and shown in detail in the circuit figures contains examples of two different ways of preventing the ring circuit cycles from discovery by analysis of the generated key. One of these two ways is by using holding circuits (shown at 46) to make the character of the output pulses from the holding circuits dependent in an uncertain way upon the past history of some of the signals from the ring circuits rather than upon only the currently produced ring circuit outputs. The other of these two ways is by generating relatively high frequency signals and sampling only every $m^{th}$ signal ignoring the intervening signals. These two types of ring circuit screening means will be briefly discussed.

Figure 9:
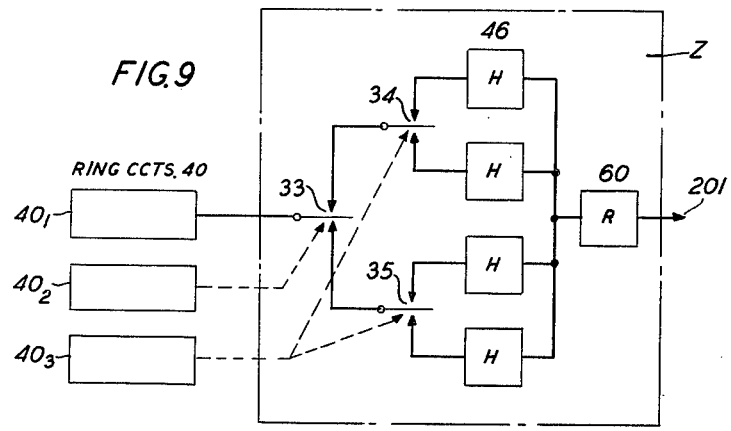
FIGS. 9, 10 and 11 show block diagrams of alternate suggested types of holding circuit arrangements that may be used.

The holding circuit principle was disclosed in my prior application, Ser. No. 555,913 referred to but is shown in extended form in the holding circuits 46 of FIG. 1 and in diagram in FIGS. 9, 10 and 11. FIG. 9 is merely a repetition of the showing of the four holding circuits 46 of FIG. 1 with a simplified control circuit in which the controls are taken directly from the ring circuits 40, for illustration. As already described, the output pulse at 201 is determined conjointly by the currently produced signals from ring circuit $40_1$ and the stored signals, in three of the holding circuits, which have been stored for one or more signal intervals and which originally also came from ring circuit $40_1$. The time of storage is determined in each instance by the signals from ring circuits $40_2$ and $40_3$.

Such a circuit may be termed a "semi-sequential" circuit (instead of a sequential circuit) in that this circuit will clear out in a short time in case of an error instead of perpetuating the error indefinitely. It must be borne in mind that the operations of the key generators must be duplicated at the different stations. If an error occurs in the performance of some part of the circuit at one station, such as failure of a ring circuit to produce a marking pulse when it should, it is highly desirable not to allow this error to persist long enough to interfere seriously with reception of the message. The holding circuit principle exemplified in FIG. 9 depends in an uncertain way upon the recent past history of the signals in preceding parts of the circuit and so will retain an error for a time but the important thing is that the circuit will entirely clear itself in a time that is short compared with an essential fragment of speech.

It may be noted that some form of sequential operation is highly desirable if it is desired to produce a strong key that will resist solution by a cryptanalyst. A wholly systematic operation in which the output is the product only of current signals in the generator in general results in a soluble key. A wholly sequential performance has the disadvantage already noted that an error is forever perpetuated, requiring perfect performance of the system. The semi-sequential principle disclosed here has the cryptographic advantage of the wholly sequential system without its practical disadvantage.

Figure 10:
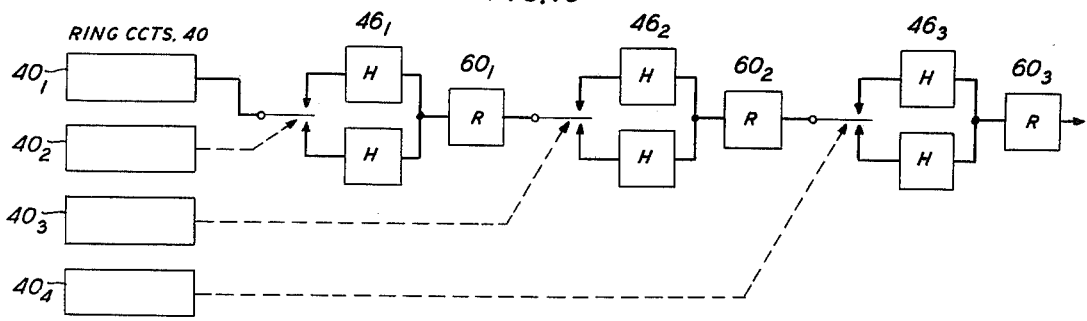

In FIG. 10 is illustrated an alternative holding circuit combination in which the holding circuits in pairs are placed in tandem. Signals generated in ring circuit $40_1$ are sent into one or other of the pair of holding circuits $46_1$, depending upon signals from ring circuit $40_2$. The outputs of the holding circuits of this pair are added and reentered at $60_1$ to give an output space if the individual outputs are alike or an output mark if the individual outputs are different. This output mark or space is fed into one or another of the holding circuits of the pair $46_2$ depending on the signals from ring circuit $40_3$, and so on. While three pairs of holding circuits are shown in tandem, this arrangement can be extended to other tandem stages as may be desired. The clearing out time for the tandem arrangement is shorter than for the parallel arrangement (FIG. 9) for the same number of pairs of holding circuits. The clearing out time for the two-pair parallel circuit is comparable to that of a four-stage tandem arrangement in that in both circuits for 90 percent of the time the clearing out interval will not be in excess of approximately the same maximum time.

Figure 11:
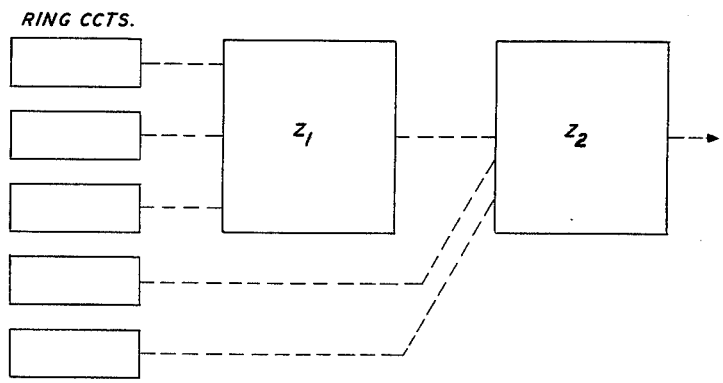

The holding circuit principle is not limited in its use to either the parallel or the series type since several parallel arrangements such as shown in box Z of FIG. 9 can be placed in tandem as at $Z_1$ and $Z_2$ of FIG. 11.

In these illustrative cases of holding circuits the pulses or signals involved are two-valued pulses but this is not to be taken as a limitation since holding circuits are possible for storing signals having a greater number of values than two.

The other ring cycle concealing means mentioned above, is the means provided for sampling and using only every $m^{th}$ signal of a succession of signals or pulses where $m$ is a fairly large number. In the illustrative example given, $m$ has the value 60 although there is no special significance to this number it being chosen as large enough to give the desired result of effectively preventing discovery, by analytical study of the ring circuit cycles. This principle is utilized in actuating the steppers $S_1$, $S_2$ and $S_3$ by exposing each of these steppers once every 500th of a second to the 30,000 per second ring circuit signals so that each stepper samples only every 60th such signal. Each stepper pulse therefore depends upon a past history which is hidden from an analyst working on the output key.

The invention is not to be construed as limited to the specific circuits or apparatus disclosed nor to the magnitudes of various quantities given for illustration but the scope is defined in the claims, which follow.

What is claimed is::

1. In a key pulse generating circuit for producing key pulses varying in amplitude in highly irregular manner, said pulses occurring at a given rate, means to generate high speed off-on pulses at a rate many times higher than said given rate in a plurality of separate paths, means to hold over certain of said off-on pulses into subsequent of said high speed pulse times, means to combine the pulses so held over with pulses subsequently generated in certain of said paths to form combination of said high speed pulses, and means to select and combine with one another to form one of the final key pulses occurring at said given rate, individual ones of said last-mentioned high speed pulses occurring at instants of time separated from one another by several of said high speed pulses while discarding the intervening high speed pulses.

2. In combination a plurality of ring circuits of different numbers of stages for generating cycles of different length, a group of holding circuits, means to impress on the input of one holding circuit at a time a pulse representing the resultant of simultaneously produced pulses from a plurality of said ring circuits, means controlled conjointly from others of said ring circuits for determining which holding circuit has impressed upon it at any one time such resultant pulse, a common output circuit for said holding circuits, said output circuit carrying a currently produced resultant pulse and pulses held over from previous pulse producing times superposed on one another, and means for selecting for use the current existing in said common output circuit at only separated instants of time with several of the primary pulse periods intervening between the current selecting instants.

3. In a pulse producing circuit, holding circuits divided into groups, means to produce separate series of irregular pulses in separate primary circuits, means to impress pulses in the first of said primary circuits upon said holding circuits, one at a time, means controlled by pulses in the second of said primary circuits to determined whether the pulse in the first primary circuit is to be applied to one of the holding circuits in the first group or to one of the holding circuits in the second group, means controlled by pulses in the third of said primary circuits to determine which of the holding circuits in the group determined by the pulse in the second of said primary circuits is to have applied to it the pulse in the first of said primary circuits, and a common output circuit for receiving from said holding circuits pulses which are the resultant of a currently applied pulse and pulses held over from different previous pulse periods.

4. In a pulse producing system, means to produce pulses at high rate in irregular sequence in the same circuit, means to sample said pulses only at instants of time separated from one another by several intervening periods of said high rate pulses, said sampling means including a plurality of separate sampling circuits operating in mutually staggered time relation whereby each samples a defferent one of said high rate pulses, means to prolong the sampled pulses in said sampling circuits into an overlapping time period with one another and means to derive a resultant summation pulse from said sampling circuits in common during said overlapping time period.

5. In a pulse producing circuit, means to produce pulses occurring at a high frequency and in irregular sequence, means to select a plurality of said pulses one at a time, with a large number of intervening pulses occurring between selected pulses, means to hold over the earlier selected of said plurality of pulses into overlapping time relation with respect to the last selected of said plurality of pulses, and means to combine the earlier and last selected pulses into a single resultant pulse.

6. A pulse producing system comprising an initial portion operating at high frequency and a subsequent portion operating at low frequency, means to generate irregularly occurring pulses at high frequency in said initial portion, means in said subsequent portion to produce low frequency pulses each having a time period great enough to include many successive high frequency pulse periods, including means for selecting from among said high frequency pulses a plurality or pulses all occurring at different non-overlapping times within one low frequency pulse period and separated from one another in time by a plurality of high frequency pulse periods, and means to combine each such plurality of selected pulses into a single resultant low frequency pulse in said subsequent portion of said system.

7. In a pulse producing system for supplying low frequency pulses with highly irregular manner of variation to a load circuit, for keying or kindred purposes, means to generate irregularly occurring high frequency pulses, a plurality of stepper circuits for translating from high frequency pulses to low frequency pulses, means to impress one of said high frequency pulses upon the first stepper for establishing therein a current representative of such one pulse, means to skip over several subsequent high frequency pulses and thereafter to impress one of said high frequency pulses from said generating means upon the second stepper for establishing therein a current representative of said latter pulse, both of said one and latter high frequency pulses occurring within the period of duration of one of said low frequency pulses, and means to combine the currents existing in both of said steppers at the same time to determined a low frequency pulse for supply to said load circuit.

8. In a key producing circuit, separate source of irregular pulses, a plurality of holding circuits each having an input circuit and an output circuit, means to connect, effectively, the input circuits of said holding circuits, one at a time, to certain of said sources in irregular order under control of pulses from other of said sources, each holding circuit, when not receiving pulses from any of said sources, maintaining the current in its ouput circuit at a value representative of the last pulse that was impressed on its input circuit from a said source, a common output terminal for the output circuits of all of said holding circuits, a bank of stepper circuits having input and output sides, circuits leading from their output sides in parallel to a common load point, and means for connecting the input sides of said stepper circuits one at a time in succession to said common output terminal whereby pulses of different character are impressed upon the different stepper circuits from said holding circuits.

9. A system according to claim 8 including a reentry circuit inserted between said common output terminal and said stepper circuits for reducing the amplitudes of pulses received from said common output terminal by a fixed quantity where necessary to limit the amplitude of the pulses impressed on said stepper circuits to a value representative of a pulse received from a single one of said sources.

10. In a key producing circuit, sources of irregular pulses for use in producing final key pulses, holding circuits divided into groups, each holding circuit having an input side for receiving pulses and an output side, means controlled by pulses from one of said sources for effectively connecting the input sides of individual holding circuits of the first group, one at a time, to receive pulses from another of said sources, each holding circuit when not connected to receive pulses on its input side maintaining its output current at a value representative of the impulse that was last impressed on its input side, the output sides of the holding circuits of said first group being connected to a common terminal, means controlled by pulses from another of said sources for effectively connecting the input sides of individual holding circuits of the second group, one at a time, to receive pulses from said common terminal, the output sides of the holding circuits of said second group being connected to a common point, and a load circuit connected to receive the pulses appearing at said common point.

* * * * *